US007211347B2

(12) United States Patent
Sugiura et al.

(10) Patent No.: US 7,211,347 B2
(45) Date of Patent: May 1, 2007

(54) BATTERY PACKS HAVING IMPROVED HEAT RADIATION

(75) Inventors: Masatoshi Sugiura, Anjo (JP); Youichi Kato, Nagoya (JP); Kazuyuki Sakakibara, Okazaki (JP)

(73) Assignee: Makita Corporation, Aichi-Ken (JP)

(*) Notice: Subject to any disclaimer, the term of this patent is extended or adjusted under 35 U.S.C. 154(b) by 495 days.

(21) Appl. No.: 10/325,264

(22) Filed: Dec. 19, 2002

(65) Prior Publication Data

US 2003/0096160 A1 May 22, 2003

Related U.S. Application Data

(62) Division of application No. 09/417,698, filed on Oct. 13, 1999, now Pat. No. 6,537,694.

(30) Foreign Application Priority Data

Oct. 15, 1998 (JP) .................... 10-294071
Mar. 23, 1999 (JP) .................... 11-78343

(51) Int. Cl.
*H01M 2/10* (2006.01)
*H01M 10/50* (2006.01)
*H01M 10/46* (2006.01)

(52) U.S. Cl. .................... 429/120; 429/99; 429/100; 429/178

(58) Field of Classification Search .................. 429/99, 429/100
See application file for complete search history.

(56) References Cited

U.S. PATENT DOCUMENTS

| 4,313,080 A | 1/1982 | Park |
| 4,517,263 A | 5/1985 | Reiss et al. |
| 4,522,898 A | 6/1985 | Esrom |
| 4,724,189 A * | 2/1988 | Chase .................... 429/99 |
| 4,806,440 A * | 2/1989 | Hahs et al. .................... 429/100 |
| 5,015,545 A | 5/1991 | Brooks |
| 5,204,609 A | 4/1993 | Alisauski |
| 5,229,702 A | 7/1993 | Boehling et al. |
| 5,461,299 A | 10/1995 | Bruni |
| 5,480,734 A | 1/1996 | Schulz et al. |
| 5,541,015 A | 7/1996 | Tajima et al. |
| 5,583,418 A | 12/1996 | Honda et al. |
| 5,592,065 A | 1/1997 | Oglesbee et al. |
| 5,680,030 A | 10/1997 | Kadouchi et al. |
| 5,721,064 A | 2/1998 | Pedicini et al. |
| 5,856,037 A | 1/1999 | Casale et al. |
| 5,883,491 A | 3/1999 | Silverman |
| 5,977,746 A * | 11/1999 | Hershberger et al. ........ 320/112 |
| 5,991,665 A | 11/1999 | Wang et al. |
| 6,007,937 A | 12/1999 | Ruiz Rodriguez et al. |
| 6,025,086 A | 2/2000 | Ching |
| 6,087,038 A | 7/2000 | Flament et al. |
| 6,218,807 B1 | 4/2001 | Sakaue et al. |
| 6,339,312 B2 | 1/2002 | Sakaue et al. |
| 6,342,773 B2 | 1/2002 | Sakaue et al. |
| 6,455,186 B1 * | 9/2002 | Moores et al. .................. 429/71 |

FOREIGN PATENT DOCUMENTS

EP 0 562 869 A1 9/1993

(Continued)

OTHER PUBLICATIONS

Moores et al., U.S. Appl. No. 09/035,586, filed Mar. 5, 1998.

Primary Examiner—John S. Maples
(74) Attorney, Agent, or Firm—Perkins Coie LLP

(57) ABSTRACT

A battery pack (1) has a double casing structure, including an inner case (2) disposed inside an outer case (3). The inner case (2) includes a radiator plate (9) that is in contact with the side walls of battery cells (4) disposed within the battery pack (1). A forked air passage (32) extends from an air inlet (27) and is defined between the inner case (2) and the outer case (3) and along the outer surface of the radiator plate (9) until reaching a pair of air outlets (31).

10 Claims, 8 Drawing Sheets

FOREIGN PATENT DOCUMENTS

| | | |
|---|---|---|
| EP | 0 739 048 A1 | 10/1996 |
| EP | 0 869 571 A1 | 10/1998 |
| EP | 0897 195 A2 | 2/1999 |
| EP | 0 920 105 A2 | 6/1999 |
| EP | 0 940 864 A2 | 9/1999 |
| EP | 0 940 864 A3 | 9/1999 |
| GB | 2 289 977 | 12/1995 |
| JP | 5-37634 | 1/1987 |
| JP | 1-105474 | 4/1989 |
| JP | 6-54207 | 12/1992 |
| JP | 07014616 | 1/1995 |
| JP | 07065869 A | 3/1995 |
| JP | 08138762 A | 5/1996 |
| JP | 08273706 | 10/1996 |
| JP | 10012287 A | 1/1998 |
| JP | 11-219733 | 8/1999 |
| JP | 11-339861 | 12/1999 |
| WO | WO 89/08345 | 9/1989 |
| WO | WO 94/02969 | 2/1994 |

* cited by examiner

BATTERY PACKS HAVING IMPROVED HEAT RADIATION

This application is a Divisional of U.S. patent application Ser. No. 09/417,698, filed on Oct. 13, 1999, now U.S. Pat. No. 6,537,694 which claims priority to Japanese Patent Application No. 10-294071, filed on Oct. 15, 1998, and Japanese Patent Application No. 11-78343, filed on Mar. 23, 1999, the contents of which are incorporated herein by reference.

BACKGROUND OF THE INVENTION

1. Field of the Invention

The present invention generally relates to battery packs. More particularly, the present invention relates to battery packs having battery cells that are disposed within a case and are used as power sources for electric power tools.

2. Description of the Related Art

Generally, battery packs for electric power tools include exposed electric terminals for charging and discharging the enclosed battery cells. When a battery pack is attached to an electric power tool, electrical contact is established between the terminals of the battery pack and the terminals of the battery holder in the tool, thus supplying power to the tool. When the charge level of a battery pack becomes low, the pack is set in a battery charger to establish electrical contact between the charging and discharging terminals of the pack and the charging terminals of the battery charger, thus recharging the battery cells in the pack.

When charging the battery cells in a battery pack, the temperature of the battery cells rises due to buildup of heat in the battery cells themselves and heat conduction from the transformer of the charger. In certain types of cells and batteries, such as nickel metal hydride cells, this phenomenon is so severe that the service life of the cells will be shortened unless some preventative measures are taken. One structure for preventing heat buildup in a battery pack is disclosed in Japanese Laid-open Utility Model Publication No. 6-54209. This structure includes within a charger a fan for delivering air to the terminals and air passages running through the cells in the battery pack and connecting openings provided in the battery pack case. When the battery pack is set in the charger, the fan sends air through the cells along the passages in order to prevent heat buildup in the battery cells.

Although the foregoing structure can significantly lessen the deterioration of the battery cells by preventing heat buildup in the battery cells, it suffers from other drawbacks. For example, moisture and other foreign matter can easily enter the battery pack through the openings in the battery pack and may rust the battery cells, which may cause leakage of the electrolyte. Furthermore, conductive foreign matter may cause a short-circuit. In order to solve problems caused by entry of foreign matter, Japanese Utility Model Publication No. 5-37634 discloses an improved combination of a battery pack and a charger. The battery pack is provided with interlocked doors that open when the pack is set on the charger and close when the pack is removed from the charger so as to keep out foreign matter. One significant drawback of this structure is an increase in the manufacturing cost due to the sliding doors and guide bosses protruding from the charger for opening and closing the doors. Moreover, the existence of the guide bosses limits the types of battery packs that can be recharged on the charger, thus reducing its general versatility. The durability and reliability of the mechanism for operating the sliding doors is somewhat questionable because the relatively fragile guide bosses may break when the battery pack is set on the charger.

SUMMARY OF THE INVENTION

In view of the above-identified problems, an important object of the present invention is to provide a battery pack having a simple structure for preventing both internal heat buildup and entry of foreign matter.

Another object of the present invention is to provide a battery pack having a simple structure for improving the durability of the battery pack by lessening vibration and impact on the cells.

The above objects and other related objects are realized by the invention, which provides a battery pack comprising: a first case containing a plurality of battery cells; radiator means disposed in contact with the cells within the first case and having at least one surface for radiating heat conducted from the battery cells; a first air passage defined at least partially by said at least one surface of the radiator means and separated from the battery cells; and at least one air outlet formed in the first case and connected with the first air passage. This structure itself (i.e., not in cooperation with any other structure, such as a charger) easily prevents heat buildup in the battery cells in the battery pack and prevents entry of foreign matter into the inner case, thus prolonging the service life of the battery cells and preventing leakage of the electrolytic solution and short-circuiting due to rusting.

According to another aspect of the present invention, the battery cells are divided into a plurality of blocks and there is at least one second passage provided between the blocks, the at least one second air passage being in communication with the first air passage. The second air passage is provided between the cell blocks and cools the cells more evenly; thus more effectively preventing deterioration of the battery cells.

According to another aspect of the present invention, the radiator means includes a plurality of ribs, which are oriented generally parallel to the direction of airflow through at least in one of the first and second air passages. Due to the ribs extending in the direction of cooling, airflow is provided on certain surfaces of the first and/or second air passages and heat is more effectively radiated from the battery cells.

According to yet another aspect of the present invention, the battery pack further comprises a second case that is smaller than the first case, contains the battery cells and is disposed within the first case. Furthermore, the first air passage may be formed between the first and second cases and elastic material may be interposed between the first and second cases. The aforementioned double casing structure effectively lessens transmission of impact and vibration to the battery cells, thus enhancing the durability of the battery pack.

According to still another aspect of the present invention, the battery pack further comprises an air inlet provided in the first case and connected with the first air passage. The first air passage is defined by inner surfaces of the first case and continuous recesses provided on outer surfaces of the second case.

In accordance with another aspect of the present invention, each of the first and second cases has a generally box-like shape. Moreover, the first air passage starts at the inlet provided in an upper surface of the first case, proceeds along a first inner side surface of the first case, forks into two branches along two opposite second and third inner side surfaces of the first case connected to the first inner side surface, and terminates at first and second air outlets provided in a fourth inner side surface of the first case.

In another embodiment, the second case includes first to fourth outer side surfaces corresponding to the first to fourth inner side surfaces of the first case, respectively. The radiator means is a radiator plate having a generally U-shaped cross section that continuously surrounds the first, second, and third outer surfaces of the second case. Further, the ribs may be formed on outer surfaces of the radiator plate in the first air, passage.

In another embodiment, the elastic material is disposed along upper and lower edges of the first case such that the first air passage is hermetically isolated from the cells.

In another aspect, the cells are divided into two blocks and the radiator means includes first and second radiator plates arranged in parallel, each radiator plate having a generally U-shaped cross section and surrounding one of the cell blocks. Moreover, the second air passage is defined between the radiator plates.

In another aspect, the ribs are provided on outer surfaces of the first and second radiator plates in the second air passage.

In another embodiment, the battery pack of the invention further comprises a third air outlet provided in the fourth inner side surface of the first case between the first and second outlets. In this embodiment, a first end of the second air passage may be connected to the first air passage and a second end thereof is connected to the third air outlet.

To carry out the invention in one preferred mode, the second air passage is hermetically isolated from the cell blocks.

Other general and more specific objects of the invention will in part be obvious and will in part be evident from the drawings and descriptions that follow.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE INVENTION

Preferred embodiments according to the present invention will be described hereinafter with reference to the attached drawings.

Figure 1:
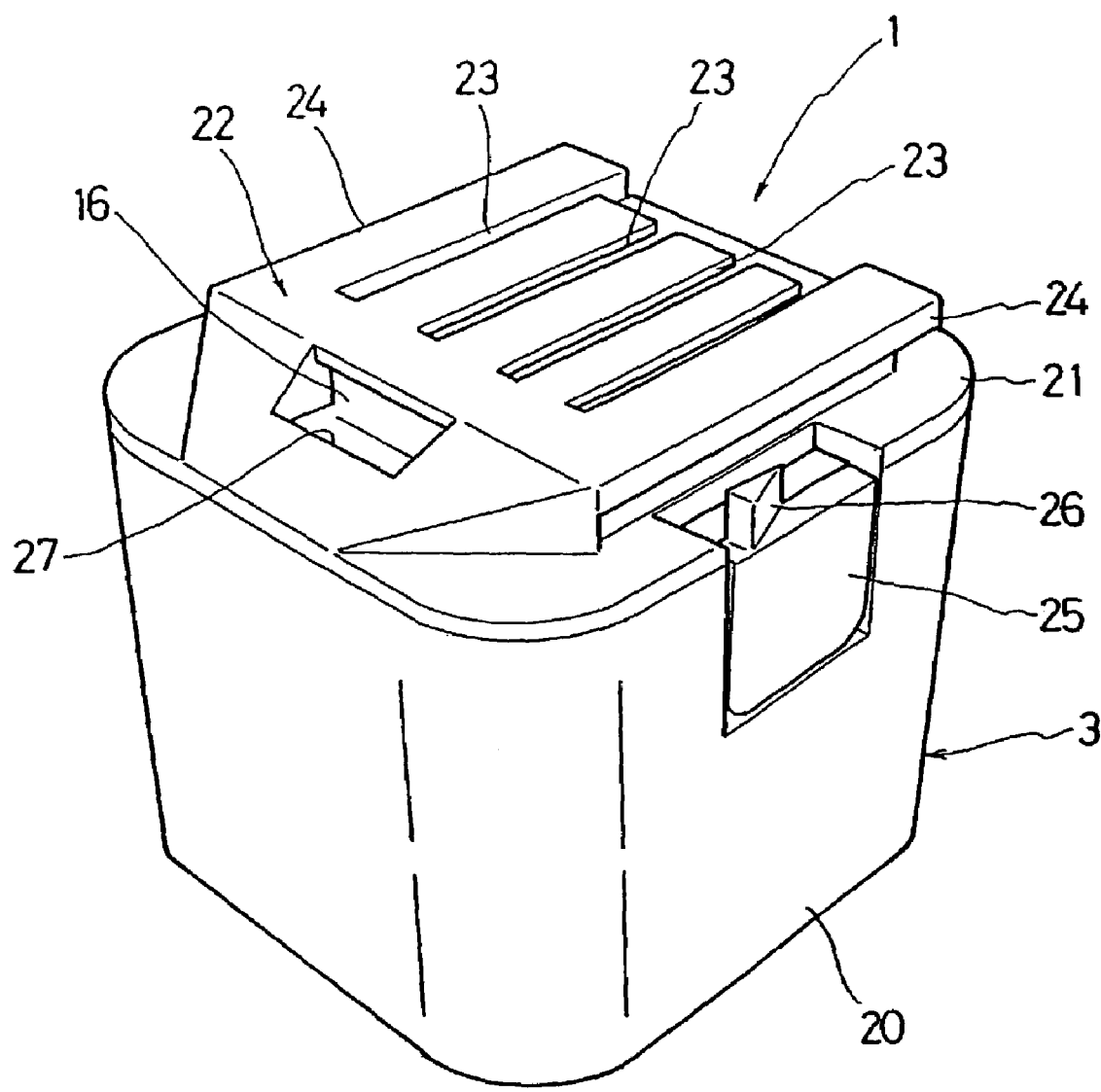
FIG. 1 is a perspective view of a battery pack according to the present invention.
Figure 2:
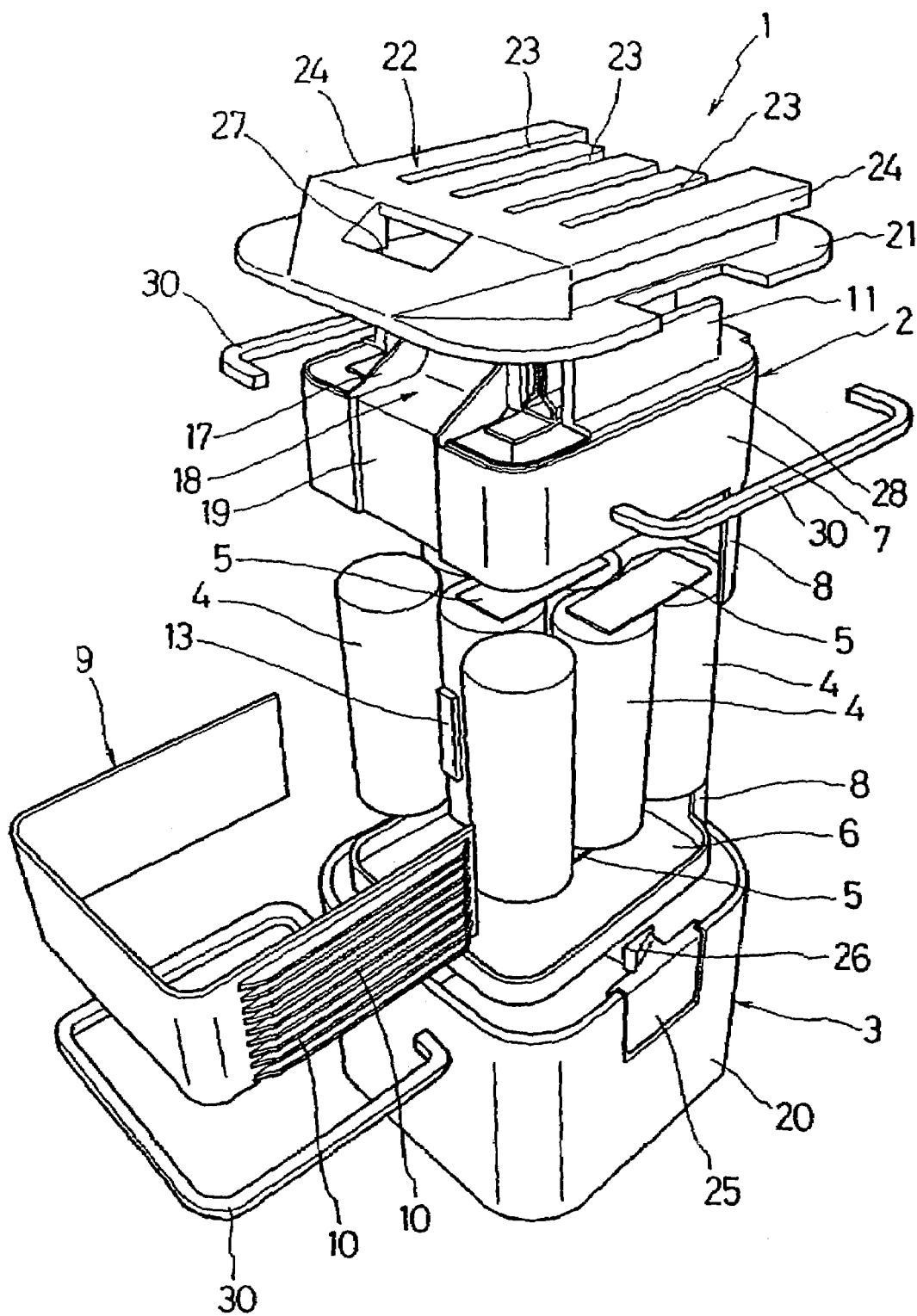
FIG. 2 is an exploded view of the battery pack shown in FIG. 1.

First Embodiment:

FIG. 1 is a perspective view of a battery pack 1 according to the present invention, and FIG. 2 shows an exploded view of the battery pack 1. The battery pack 1 has a double casing structure that includes a generally cubic inner case 2 for holding eight nickel metal hydride cells 4 in an upright position and a generally cubic outer case 3 for housing the inner case 2. The nickel metal hydride cells (hereinafter referred to as NiMH cells) 4 are connected in series by lead plates 5. The inner case 2 includes a base plate 6 on which the NiMH cells 4 are placed and a cover 7 disposed over the base plate 6. The inner case 2 further includes two coupling portions 8, each extending from the base plate 6 and the cover 7 for connecting the cover 7 to the base plate 6. The coupling portions 8 cover the side walls of the NiMH cells 4 located adjacent to the coupling portions 8, thus exposing the side walls of the other cells 4. Further included in the inner case 2 is an aluminum radiator plate 9 having a generally U-shaped horizontal cross section for radiating heat generated by the NiMH cells 4.

Figure 3:
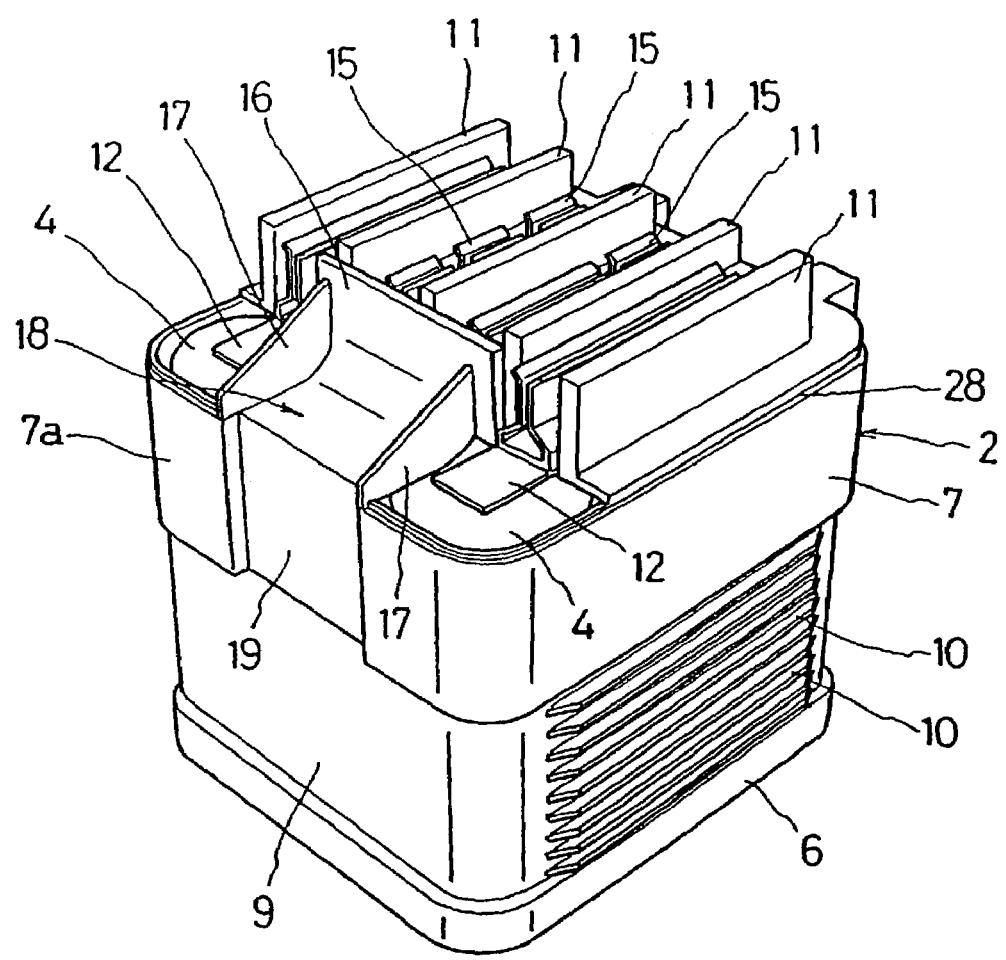
FIG. 3 is a perspective view of the battery pack shown in FIG. 1.
Figure 4:
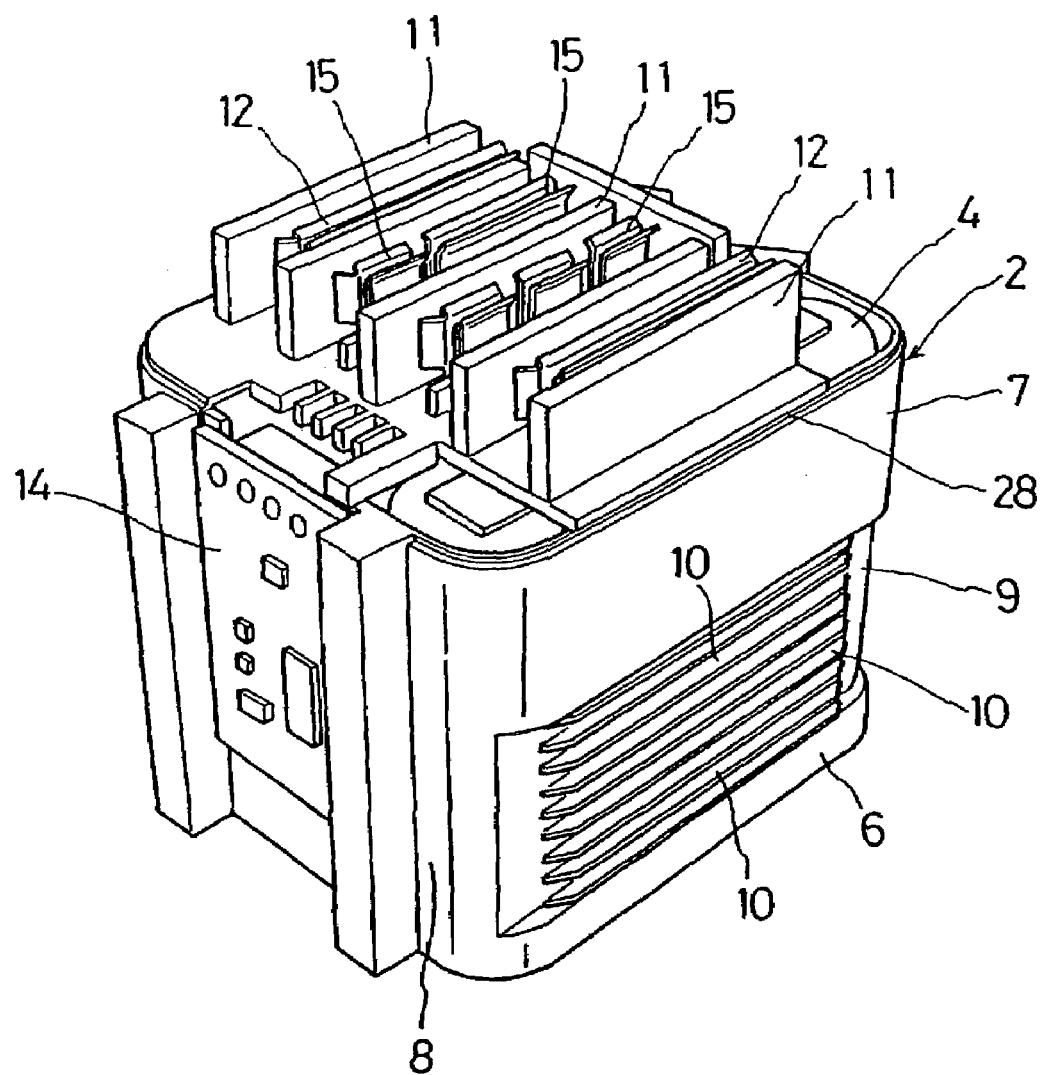
FIG. 4 is a perspective view of the battery pack shown in FIG. 1 seen from a different angle from the perspective of FIG. 3, showing a controller of the battery pack.

As shown in FIGS. 3 and 4, when set between the base plate 6 and the cover 7, the radiator plate 9 covers the exposed side walls of the NiMH cells 4, thus completely sealing the cells 4 together with the base plate 6 and the cover 7, except for the portions of the cells 4 welded to charging and discharging terminals 12. The terminals 12 are in contact with the electrodes of the terminals cells 4. The inner surface of the radiator plate 9 is covered with a highly heat conductive, electrically insulating material, which is in contact with the NiMH cells 4. The outer surface of the two parallel end walls of the radiator plate 9 has a plurality of longitudinal parallel ribs 10.

Referring to FIGS. 2 to 4, a plurality of parallel guide plates 11 project from the upper surface of the cover 7. Disposed between the guide plates 11 are the charging terminals 12 and miscellaneous terminals 15 including a temperature detection terminal connected to a temperature sensor 13, which is attached to one of the cells 4, and data transmission terminals connected to a controller 14 provided on the coupling portions 8.

Referring to FIGS. 2 and 3, the inner case 2 further includes an upper portion 16 that is formed between the charging terminals 12 in proximity to the guide plates 11. The upper portion 16 covers the upper surface of the cover 7 and extends downward to a side wall 7a located on the opposite side of the coupling portion 8 of the case 2. Two partitions 17 project from the side edges of the upper portion 16, extending from the vertical wall of the upper portion 16 to the side wall 7a. The partitions 17 and the upper portion 16 define a groove 18 that is connected with a recess 19 provided vertically in the side wall 7a.

Figure 5:
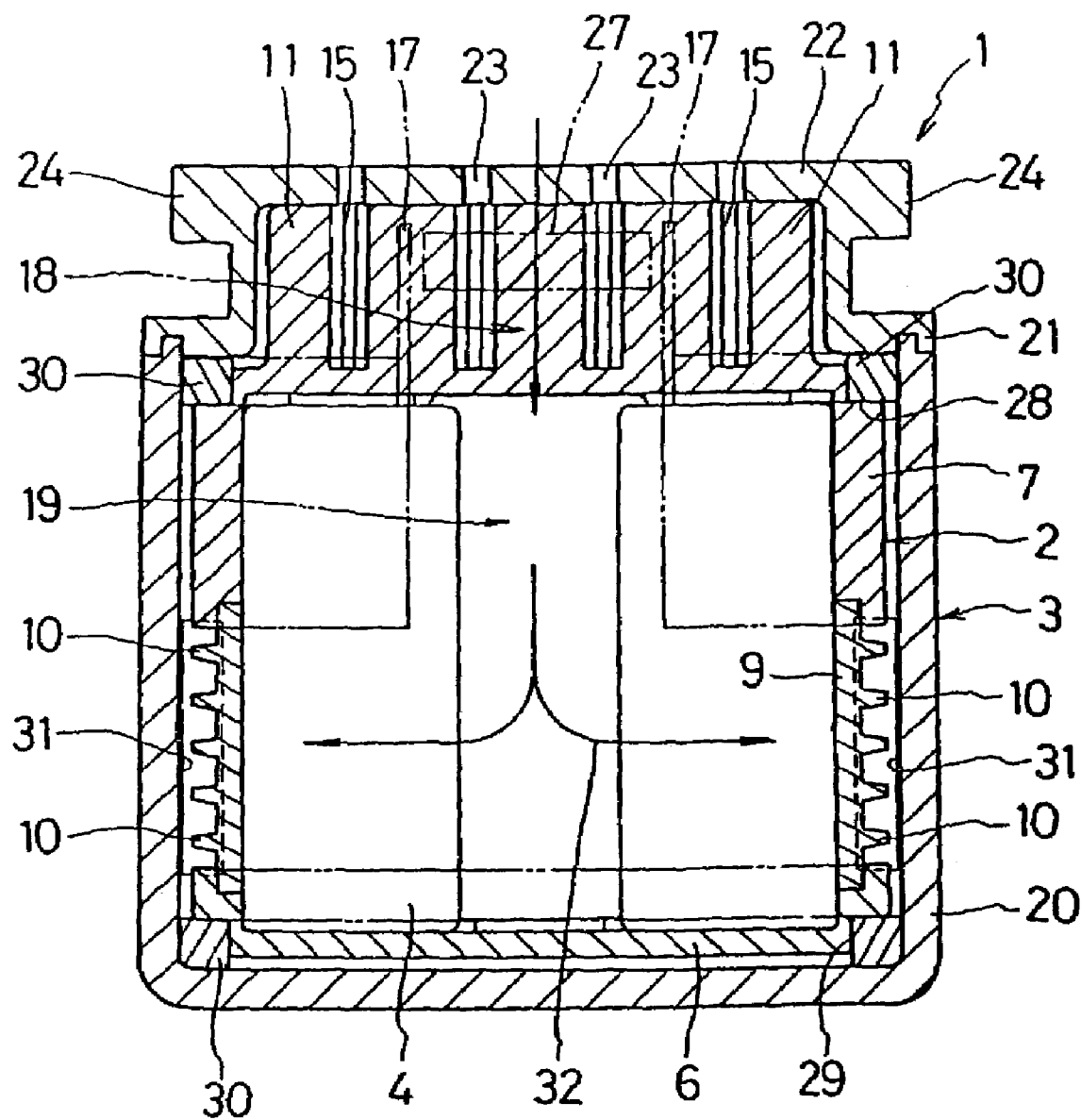
FIG. 5 is a vertical cross section of the battery pack shown in FIG. 1.

Referring to FIGS. 1 and 2, the outer case 3 includes a box-shaped main casing 20, which nearly completely encases the inner case 2, and a lid 21, which is welded to the upper opening of the main casing 20. The upper surface of the lid 21 includes a connector 22, which covers and abuts the upper surfaces of the guide plates 11 of the inner case 2, and includes slots 23 aligned with the terminals provided between the guide plates 11. As also shown in FIG. 5, a pair of brackets 24 extends from the two outer slots 23 so as to have a generally T-shaped cross section as shown in the cross sectional view of FIG. 5. When the brackets 24 are slid in the direction parallel to the slots 23 into the holder portion provided in a housing of an electric power tool, electrical contact between the terminals of the battery pack and the tool is established when the battery pack 1 is attached to the power tool.

Two lock buttons 25 are provided on the main casing 20 of the outer case 3 below the brackets 24 and are outwardly biased by plate springs (not shown). Each of the lock buttons 25 includes on the upper surface thereof a stopper 26 having a triangular cross section. When the connector 22 is slid into the holder portion of the power tool, the stoppers 26 travel over and engage the respective stoppers of the tool, thus preventing the connector 22 from being disengaged from the tool. Additionally, the connector 22 includes a surface inclined along the upper edges of the partitions 17, thus covering the upper portion 16 from above, except where an air inlet 27 is provided.

Figure 6:
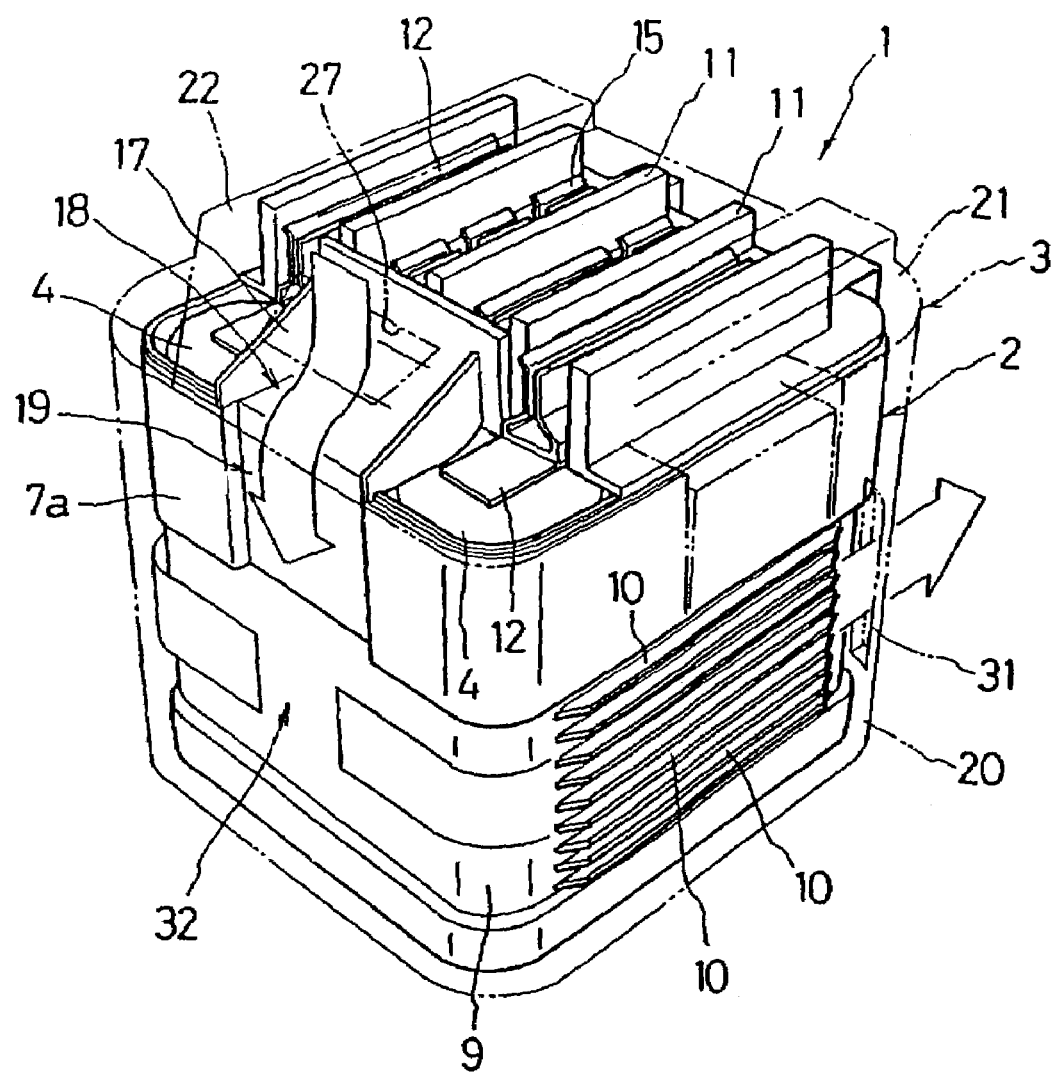
FIG. 6 is a perspective view of the battery pack shown in FIG. 1 with an outer case shown in alternate one-long-and-two-short dashed lines and airflow indicated by arrows.

Referring to FIGS. 2 and 5, grooves 28 having an L-shaped cross section are formed along the corners and the upper side edges of the cover 7, whereas a similar groove 29 also having an L-shaped cross section is formed along the corners and three lower edges of the base plate 6. Elastic members 30 made of rubber, sponge, or other suitable material, which have a square cross section, are disposed between the grooves 28 and 29 and the outer case 3. Referring to FIG. 6, two air outlets 31 (only one is shown) are provided in the portions of the main casing 20 that oppose the two ends of the radiator plate 9. When the inner case 2 is set inside the outer case 3, a forked air passage 32 is formed between the inner and outer cases 2 and 3, starting at the air inlet 27 of the outer case 3 and reaching the air outlets 31 of the outer case 3 along the groove 18, the recess 19, and the radiator plate 9 of the inner case 2. The elastic members 30 additionally seal the air passage 32 so as to isolate the passage 32 from the terminals and the exposed areas of the cells 4.

When the battery pack 1 is set on a charger (not shown) by sliding the pack 1 into the charger in the same manner as described above with regard to the attachment of the battery pack to a power tool, the NiMH cells 4 begin to generate heat. As shown in FIG. 6, airflow generated by the fan in the charger enters the passage 32 at the air inlet 27 and exits the passage at the outlets 31. Because the radiator plate 9, which is in contact with the cells 4, is located along the air passage 32 and thus is in communication with the outside of the battery pack 1, the airflow removes heat from the battery cells via the radiator plate 9. This checks the heat buildup of the cells and minimizes the deterioration of the cells 4.

The battery cells also generate heat when the battery pack 1 is set in an electric power tool as a power source. However, the fan for cooling the motor of the tool creates airflow through the air passage 32, similarly preventing an excessive temperature rise in the cells 4. Particularly, the ribs 10 provided on the radiator plate 9 facilitate radiation of heat by increasing the area of the passage 32 that is in contact with the air flowing within the passage.

Because the battery pack 1 has a double casing structure, placing the inner case 2 within the outer case 3 and the elastic members 30, which seal the air passage 32, any water or other foreign matter that enters the battery pack is contained within the passage 32 and kept out of the inner case 2. Accordingly, this structure provides protection against rusting of the cells 4, leakage of the electrolyte, and short-circuiting. According to the first embodiment, therefore, the structure of the battery pack 1 itself (i.e., not in cooperation with any other structure, such as a charger) easily prevents heat buildup in the cell 4 and prevents entry of foreign matter into the inner case 2.

Furthermore, the elastic members 30 disposed between the inner case 2 and the outer case 3 securely support the inner case 2 so as to cushion external impact and vibration without rattling. This feature makes the structure a suitable container for a power source used for electric power tools that are subjected to severe impact or vibration. In particular, neither the lead plates 5 nor the charging and discharging terminals 12 are dislodged from their spot welding in this durable structure under normal operating conditions. In addition, the elastic members 30 advantageously seal the air passage 32.

Second Embodiment:

In the structure of the first embodiment, if a large number of NiMH cells are contained within the inner case, some of the cells may not be disposed in contact with the radiator plate, thus failing to prevent heat buildup and deterioration of those cells. An alternate structure suitable for containing a large number of cells is described hereinafter with reference to FIGS. 7 and 8, in which identical or similar reference numerals or characters denote identical or similar parts or elements throughout the several views. Therefore, further description of such elements is omitted in order to avoid redundancy.

Figure 7:
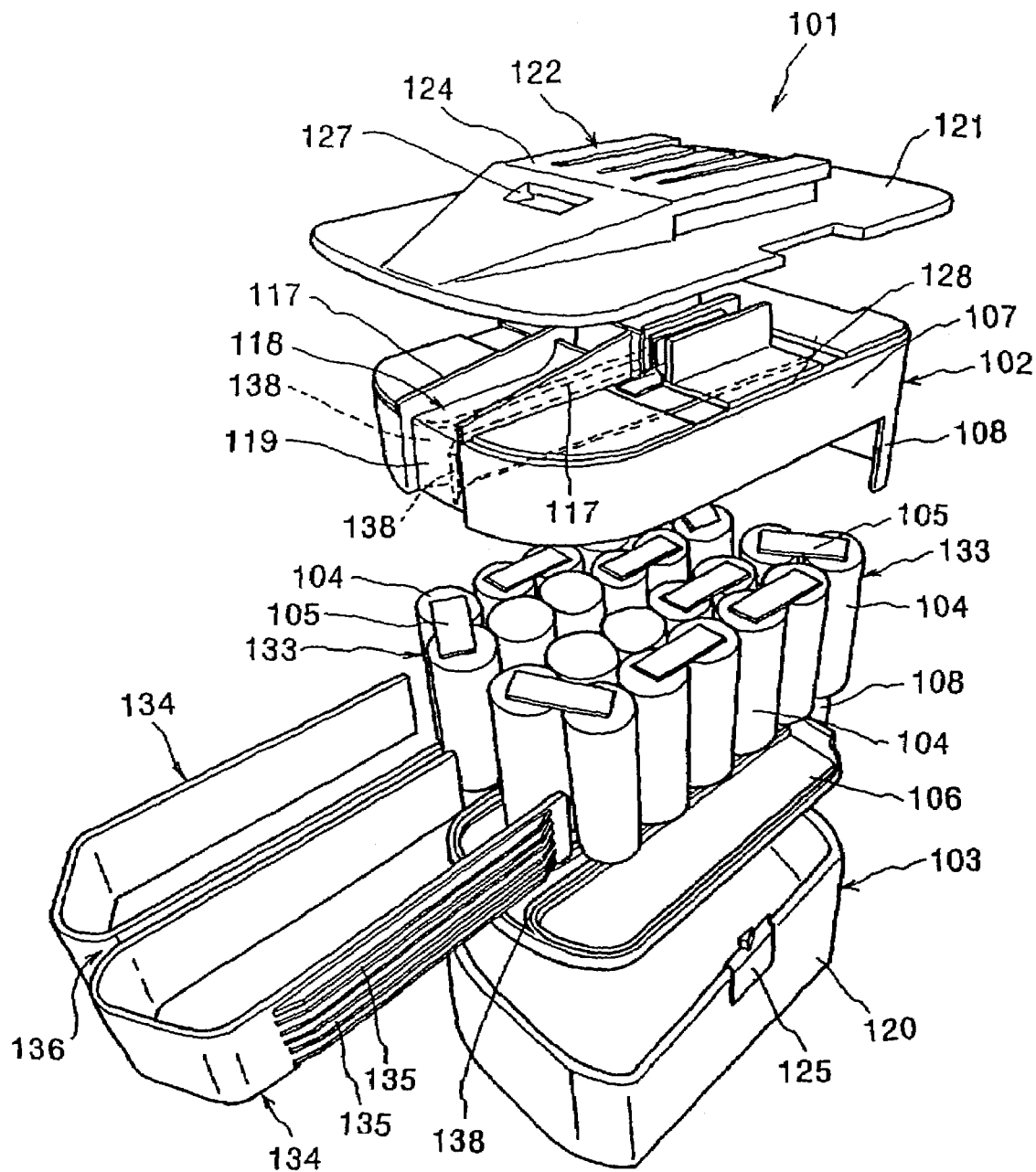
FIG. 7 is a perspective view of a battery pack of a second embodiment according to the present invention.
Figure 8:
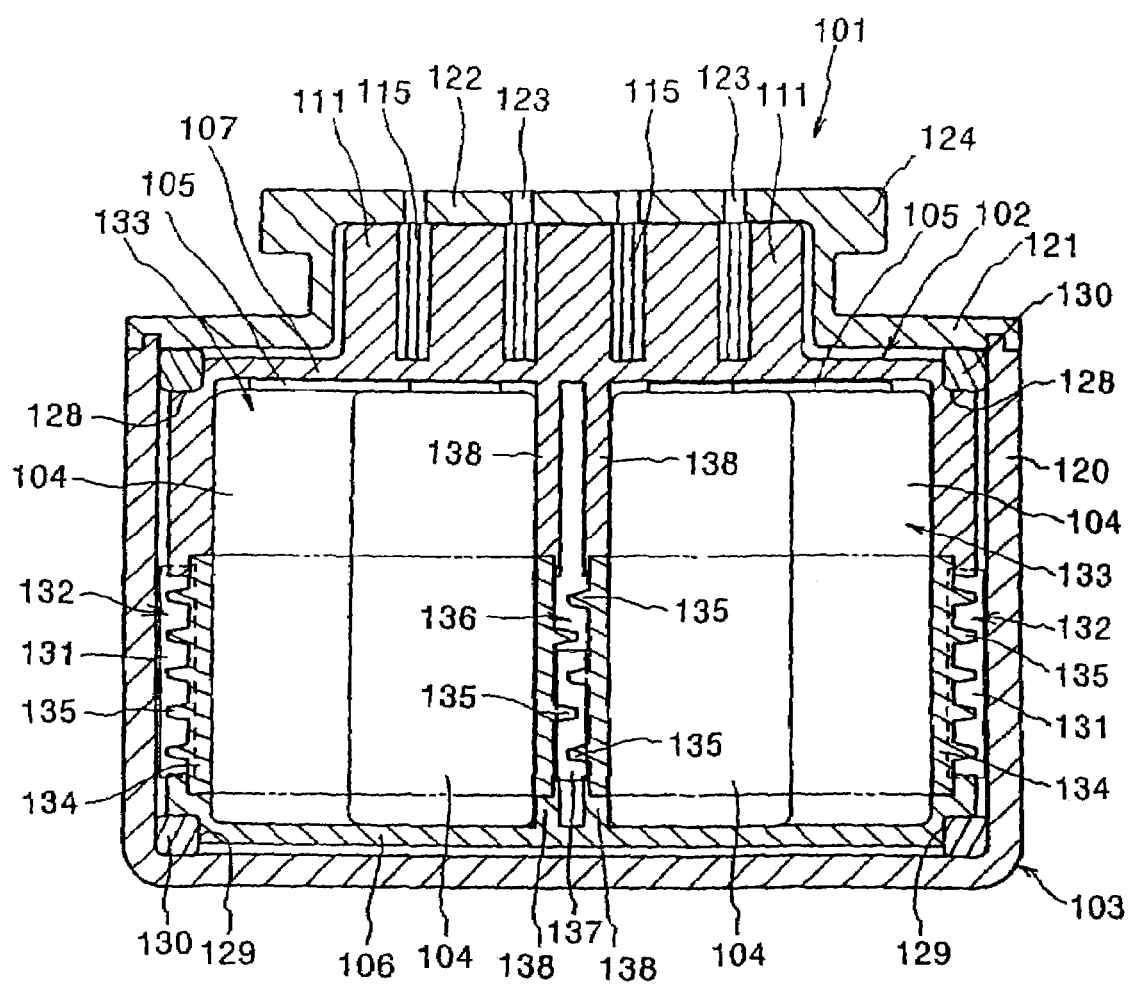
FIG. 8 is a vertical cross section of the battery pack shown in FIG. 7.

FIG. 7 is an exploded view of a battery pack 101 that includes an inner case 102 containing twenty-four NiMH cells 4, which are divided into two twelve-cell blocks 133. The battery pack 101 further includes two radiator plates 134 with ribs 135 that surround each block 133 of battery cells 4 so as to define between the blocks 133 a second air passage 136 connected to an air passage 132. The second air passage 136 is in communication with the outside of the battery pack 101 via an air outlet 137 (the cross section of this opening is limited to the cross section of either air outlet 131 due to the controller 14). Additionally, upper and lower guide rails 138 are provided on the base plate 106 and the cover 107 for each radiator plate 134. The guide rails 138 support the radiator plates 134 between the base plate 106 and the cover 107 and seal the inner case 102.

As in the first embodiment, the second embodiment prevents temperature buildup in the cells 4 and provides shock absorption and protection from dust. According to the second embodiment in particular, the second air passage 136 formed between the two blocks 133 of the cells 4 permits air to flow therethrough from the cooling fan of the charger or the electric power tool and to exit at the outlet 137, thus augmenting the cooling effect. In the structure of the second embodiment, every battery cell 4 is in contact with at least one of the radiator plates 134 such that the battery cells 4 are evenly cooled, thus minimizing deterioration of the cells 4 due to heat buildup, despite the large number of cells disposed within the battery pack 101.

Persons with ordinary skill in the art to which the present invention pertains will appreciate that the battery packs may be divided into more than two blocks by providing two or more second air passages. Likewise, the configuration of the second air passage 136 is not limited to the one described in the second embodiment; the air passage may be formed in the shape of a cross, or in a grid or in any other suitable pattern.

In the foregoing embodiments, each of the air passages 32 and 132 is defined between the flat inner surfaces of the outer case 3 (103) and the groove 18 (118), the recess 19 (119), and the radiator plate 9 (the radiator plates 134) of the inner case 2 (102). It should be noted that the same effect can be obtained by providing similar continuous structures on the inner surfaces of the outer case and making the inner surfaces of the inner case flat. Furthermore, if the controller 14 is not provided, the coupling portions 8 (108) may be narrowed such that the radiator plate 9 (the radiator plates 134) may surround substantially the entire circumference(s)

of the cell block(s). Additionally, the radiator plate 9 (the radiator plates 134) may be extended so as to increase the area in contact with the cells 4. The ribs 10 (35) may be provided on the outer surface of the radiator plate 9 (the radiator plates 134) below the side wall 7a of the inner case 2 (102). According to either of the above embodiments, a heat conductive, electrically insulating material is provided on the inner surface of the inner case; however, such a material may be instead provided on the cells 4.

Moreover, if sealing of the air passage(s) is not required, the elastic members 30 (130) may be placed only on the eight corners between the inner and outer cases. Alternatively, such elastic members may be provided in the form of sheets that are disposed between the inner and outer cases, except where the air passage(s) is located.

As described above, both battery packs 1 and 101 are set in place in a charger and an electric power tool by sliding the connector 22 (122) into the respective battery pack holding portions of the charger and the tool. Alternatively, the battery packs may have a cylindrical portion that is inserted into the respective battery holder of the charger and the tool. In this case, depending on the structure used for attaching the battery packs to tools and chargers, the design and/or the locations of the air inlets and outlets may be changed. For example, the air inlet 27 may be provided on a side surface of the outer case 3, whereas the air outlets 31 or 137 may be provided on the bottom surface of the outer case 3. In addition, these openings may be divided into a plurality of small openings or slits.

Neither of the battery packs requires a double casing structure that includes inner and outer cases as described above. For example, if first and second air passages covered with radiator means are provided in a sealed condition in one case, such that the radiator means is in contact with the cells, radiation of heat from the cells and protection of the cells against dust and moisture can be achieved. In this case, first and second air passages may be formed through the case.

The structures according to the present invention themselves (i.e., not in cooperation with any other structure, such as a charger) easily prevent heat buildup in the cell in the battery pack and prevent entry of foreign matter into the inner case, thus prolonging the service life of the cells and preventing leakage of the electrolytic solution and short-circuiting due to rusting.

The double casing structure according to the present invention, in which an inner case is placed in an outer case with air passages and elastic members provided between the two cases, lessens transmission of impact and vibration to the cells, thus enhancing the durability of the battery pack.

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A battery pack for a power tool comprising:
   a housing comprising charging and discharging terminals disposed on the housing for alternative coupling with the power tool and a battery charger,
   a plurality of battery cells disposed within the housing, with some of the battery cells including contact portions in contact with the charging and discharging terminals,
   a cooling air passage defined within the housing enabling cooling air to pass through the housing, and
   a partition separating the cooling air passage from the contact portions of the battery cells such that cooling air moving through the housing is prevented from encountering the contact portions of the battery cells.

2. A battery pack as in claim 1, further comprising an air inlet defined within the housing and in communication with the air passage, the air inlet adapted to receive cooling air from the battery charger.

3. A battery pack as in claim 2, further comprising first and second air outlets, wherein forced air received by the air inlet is divided and a first portion of the cooling air is directed along a first path and exhausted through the first air outlet, and a second portion of the cooling air is directed along a second path and exhausted through the second air outlet.

4. A battery pack as in claim 2, wherein the air inlet is arranged and constructed to communicate with an air outlet defined in the power tool, the air inlet being adapted to receive cooling air from a fan disposed within the power tool.

5. A battery pack as in claim 4, wherein the air inlet is also arranged and constructed to communicate with an air outlet defined in the battery charger, the air inlet being adapted to receive cooling air from a fan disposed within the battery charger.

6. A battery pack as in claim 5, further comprising air directors for directing cooling air from the battery charger to the air passage.

7. A battery pack as in claim 1, wherein the battery cells are nickel metal hydride battery cells connected in series.

8. A battery pack as in claim 1, further comprising a temperature sensor in communication with at least one of the battery cells.

9. A battery pack as in claim 1, wherein the battery cells are arranged and constructed to begin charging when the charging and discharging terminal contact a battery charger.

10. A battery pack as in claim 1, wherein the partition comprises a heat conductive member in communication with at least one of the battery cells and the air passage.

* * * * *